United States Patent [19]

Braitberg et al.

[11] Patent Number: 5,479,479
[45] Date of Patent: Dec. 26, 1995

[54] METHOD AND APPARATUS FOR TRANSMISSION OF AND RECEIVING SIGNALS HAVING DIGITAL INFORMATION USING AN AIR LINK

[75] Inventors: Michael F. Braitberg; Patrick J. Kennedy; Richard A. Chandler, all of Boulder, Colo.

[73] Assignee: Cell Port Labs, Inc., Boulder, Colo.

[21] Appl. No.: 50,910

[22] Filed: Apr. 20, 1993

Related U.S. Application Data

[63] Continuation-in-part of Ser. No. 773,840, Oct. 9, 1991, Pat. No. 5,333,177.

[51] Int. Cl.⁶ .................................................. H04M 11/00
[52] U.S. Cl. ....................... 379/58; 455/33.1; 370/85.7; 370/85.13; 379/59
[58] Field of Search ................................. 379/58, 59, 63; 455/33.1, 84, 89, 90; 370/85.1, 85.2, 85.7, 85.13, 95.1, 95.3

[56] References Cited

U.S. PATENT DOCUMENTS

| | | | |
|---|---|---|---|
| 4,697,281 | 9/1987 | O'Sullivan | 379/59 |
| 4,718,080 | 1/1988 | Serrano et al. | 379/59 |
| 4,792,986 | 12/1988 | Garner et al. | 455/89 |
| 4,837,800 | 6/1989 | Freeburg et al. | 379/59 |
| 4,890,315 | 12/1989 | Bendixen et al. | 379/59 |
| 4,972,457 | 11/1990 | O'Sullivan | 379/59 |
| 4,977,609 | 12/1990 | McClure | 455/89 |
| 5,020,090 | 5/1991 | Morris | 379/58 |
| 5,046,187 | 9/1991 | Takahashi | 379/93 |
| 5,081,667 | 1/1992 | Drori et al. | 379/59 |
| 5,095,503 | 3/1992 | Kowalski | 579/59 |
| 5,109,402 | 4/1992 | Anderson et al. | 379/63 |
| 5,119,397 | 6/1992 | Dahlin et al. | 375/5 |
| 5,127,041 | 6/1992 | O'Sullivan | 379/59 |
| 5,146,486 | 9/1992 | Lebowitz | 379/40 |
| 5,148,473 | 9/1992 | Freeland et al. | 379/59 |
| 5,214,774 | 5/1993 | Welsch et al. | 455/33.1 |
| 5,237,570 | 8/1993 | Smolinske et al. | 455/84 |
| 5,276,703 | 1/1994 | Budin et al. | 370/85.2 |
| 5,297,142 | 3/1994 | Paggeot et al. | 379/63 |
| 5,331,634 | 7/1994 | Fischer | 370/85.13 |
| 5,371,734 | 12/1994 | Fischer | 370/95.1 |

OTHER PUBLICATIONS

AB3X Cellular Interface Owner's Manual, Morrison & Dempsey Communications, Nov. 16, 1987.

*Primary Examiner*—Dwayne D. Bost
*Attorney, Agent, or Firm*—Sheridan Ross & McIntosh

[57] ABSTRACT

A cellular telephone is interconnected to a control unit via a cable. The cable contains both appropriate interdisciplinary connections for attachment to the telephone at one end and to the control unit at the other end via a universal connector. At least one contact of the universal connector is capable of producing a signal coded to identify the type of cellular telephone attached to the connector at the other end. A decoder at the control unit identifies the type of phone as by table look-up and establishes appropriate interfacing operational functions at its universal connector to properly operate with the telephone. Accordingly, the control unit can function with any of a wide variety of cellular telephones having differently configured cable connections and cable connector disciplines of contact assignments. In addition, the control unit may include circuitry for controlling a number of peripheral devices which are operable to send and receive digital data through the cellular phone unit to and from remote devices via radio frequency signals.

29 Claims, 9 Drawing Sheets

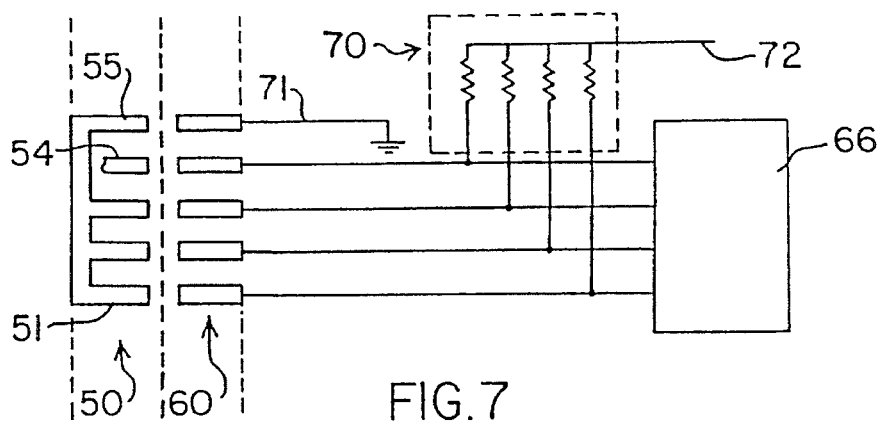
FIG. 7
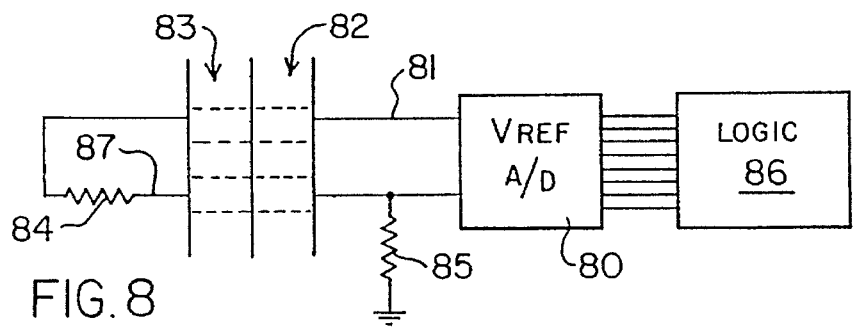
FIG. 8
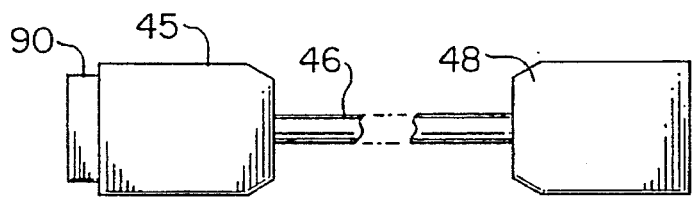
FIG. 4
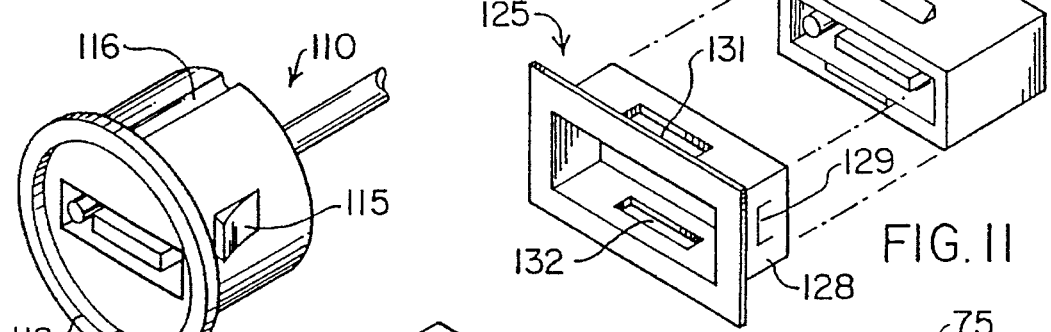
FIG. 11
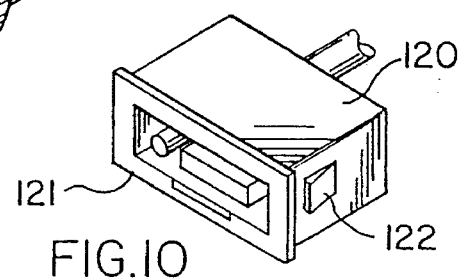
FIG. 12
FIG. 10
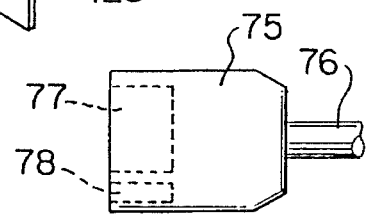
FIG. 13

1

METHOD AND APPARATUS FOR TRANSMISSION OF AND RECEIVING SIGNALS HAVING DIGITAL INFORMATION USING AN AIR LINK

RELATED APPLICATIONS

The present application is a continuation-in-part of commonly assigned U.S. patent application Ser. No. 07/773,840 filed Oct. 9, 1991, now U.S. Pat. No. 5,333,177.

BACKGROUND OF THE INVENTION

1. Field of the Invention

The present invention relates to wireless radio transmission of voice and data information.

2. Background of the Invention

Cellular telephone systems have gained widespread acceptance as an efficient means of mobile voice and data communications. While early mobile units were large and complex, miniaturization has made possible hand-held units with full functional capabilities allowing the user freedom to use the phone unit without connection to the vehicle. Unfortunately, this miniaturization has made portable and or hand-held units less practical for vehicular use. For example, battery charging, remote antenna connections, voice and data communications, and most importantly, what is known as "hands free" operation require physical connection to the phone unit.

To solve this problem cellular phone manufacturers have made available car kits to provide the required features. These kits include physical hardware to retain the phone in the vehicle including an attachment for establishing an electrical connection to the phone and various types of remote speakers, microphones and external antenna connections. The speakers and microphones provide "hands free" operation, and the external antenna connection improves reception of RF signals in the highly metallized automobile environment. These kits also include complex electronics modules to provide a variety of battery charging and audio amplification services to the phone unit.

There are a large number of models of cellular telephones in existence and each physical interconnection and electrical interface is unique to a manufacturer's specific model. There are many examples of presently used physical interconnections. As a result, car kits do not provide any form of universal connection and are neither physically nor electrically interchangeable. Further, because of the large variety and relatively low volume production of these kits, users are forced to pay prices comparable to the much more complex phone unit itself to obtain these kits.

This situation has caused a hardship on cellular telephone users and affected the marketplace for new equipment. Fleet users, for example, cannot provide a universal car kit connection for the variety of phones they may acquire. Users are forced to abandon their investment in the car kit when purchasing new models of telephones. These limitations have prevented businesses such as car rental agencies from providing users with means to use their car phones in rented vehicles. Further, the high cost of these car kits has caused many users to operate hand-held units while driving, an unsafe condition which is subject to increasing governmental concern and regulation.

In addition, recent advancements in the field of electronics has made it desirable to be able to transmit and receive digital data using a cellular phone. Modern communications networks, notably cellular radio telephone systems, have allowed the possibility of wide area networks for digital data transfer and control. At present, data communication is conventionally accomplished via analog channels with Advanced Mobile Phone Service (AMPS) type (FM) phones. In order to send digital information, modems are used to convert digital signals to analog tones which are sent through the phone via the normal wireless radio voice channel. AMPS type phones also include a digital channel for transceiving command and control signals to and from the phone circuitry. However, no output pin is currently provided for transferring digital information beyond the phone itself.

In recent years, progress in the field of wireless personal communications has been impeded by the limited amount of assigned radio spectrum. In response, the industry has recently developed digital wireless phones which can more easily share the available RF spectrum by packetizing data. Digital wireless phones such as Time Division Multiple Access (TDMA) and Code Division Multiple Access (CDMA) phones have the capability of passing digital information via a special digital data burst mode. However, both CDMA and TDMA require bandwidth compression of voice signals in order to make more efficient use of available RF spectrum. This is typically accomplished by some form of voice encoding/decoding module (often called a vocoder) which systematically reduces the number of bits per second required to be sent to represent voice signals based on a predetermined knowledge of the workings of the voice tract. By optimizing the coding process for voice signals, the transmitted bit rate can be reduced from several tens of kilobits per second to a few kilobits per second, thereby making more efficient use of the available RF spectrum.

Since the vocoders are designed specifically to work with voice signals, they cannot accommodate modem, facsimile, or other signals that do not exhibit voice characteristics. Data signals must be sent in a different fashion, ideally as digital signals. Neither the conventional AMPS cellular telephones nor the new analog/TDMA dual-mode cellular phones presently provide a digital data path into or out of the phone.

SUMMARY OF THE INVENTION

One object of the present invention is to provide a universal physical and electrical connection to a plurality of different kinds of hand-held cellular telephone units. A selectable adapter cable coding permits determination of the unique identity of the type of attached phone thereby allowing a data processing unit or the like to establish appropriate electrical interfacing support operations. A further purpose oil the invention is to provide means to interface with a large number of hand-held and portable phones to achieve low cost electrical adapters that are useful with many makes and models of phones.

Another object of the present invention is to provide a universal car kit which will adapt its operation to the needs of whatever cellular phone is attached to it. The universal car kit may be used with the selectable adapter cable to enable the operation of any hand-held portable cellular phone in a car kit environment.

Still another object of the present invention is to provide a method and apparatus for controlling a number of peripheral devices which may transmit and receive digital data via RF signals through a wireless radio unit. This embodiment may be used with the universal car kit to provide expanded communications capabilities in the automobile environment.

One embodiment of this invention provides a universal interface with a cable having on a first end a multiple contact connector of a predetermined number of contacts in a predetermined configuration and contact assignment discipline. At least one of the first end connectors are adapted for presenting a coded signal. That signal coding identifies at least the type of cellular phone attached to the connector on the opposite end of the cable. An arrangement is coupled to the coded signal connector for determining the type of cellular phone attached to the opposite end connector of the cable. Once the phone identification is determined, the system enables the cable first end connector contacts for performing functional operations with the cellular telephone attached to the cable.

The coded signal identifies a particular model of cellular telephone. Information for controlling the cable first end connector for functionally operating with a particular one of a plurality of cellular telephones is retrievably stored as a multiplicity of information groups. Each such group is selectable in accordance with the coded signal. This makes it possible to respond to a received coded signal for selecting the information group identified thereby from storage and for using that group to enable appropriate interfacing with the cellular telephone through the cable connectors.

A second embodiment of the present invention includes a car kit controlling means for controlling car kit operations which are dependent on the type of wireless telephone used. The car kit controller of this embodiment includes circuitry for connecting the car kit to the phone via the universal connector cable described above. Some of the car kit operations which are variable according to the specific model of wireless telephone employed include DC power level control, battery charging regulation, send and receive audio level control, external antenna coupling, and formatting of control data between the car kit and the phone.

A further embodiment of the present invention includes additional circuitry in the car kit controller for controlling peripheral devices attached to the car kit. A plurality of different peripheral devices may be attached to a bus which is connected to the car kit controller. The car kit controller of the present invention is able to transmit data to and from the peripheral devices on the bus over radio frequency signals using the wireless telephone. Any number of different peripheral devices may be attached to the bus including a navigational positioning device (e.g. GPS receiver), a display unit, a Compact Disc read only memory (CD-ROM), a security system, a personal digital assistant (PDA), a keypad, a vehicle monitoring system (VMS), etc. Thus, the applications of this embodiment are varied and many.

Those having normal skill in the art will recognize the foregoing and other objects, features, advantages and applications of the present invention from the following more detailed description of the preferred embodiments as illustrated in the accompanying drawings.

BRIEF DESCRIPTION OF THE DRAWINGS

FIG. 4 is an exemplary embodiment of an adapter cable in accordance with the present invention.

FIG. 7 is a diagram of an embodiment in accordance with this invention for identifying the adapter interface connector.

FIG. 8 is a partially schematic diagram of another embodiment of this invention for identifying the adapter cable by selectable resistor means.

FIG. 10 shows a configuration of a cable connector mounting suitable for attachment to a panel, dashboard, bulkhead or the like.

FIG. 11 is another configuration of a cable connector mounting suitable for a panel type attachment.

FIG. 12 is an arrangement for a cable connector mounting as a replacement for a vehicle cigarette lighter.

FIG. 13 is an illustration of a female connector for adapting the FIG. 4 cable as an extension.

DETAILED DESCRIPTION

Figure 1:
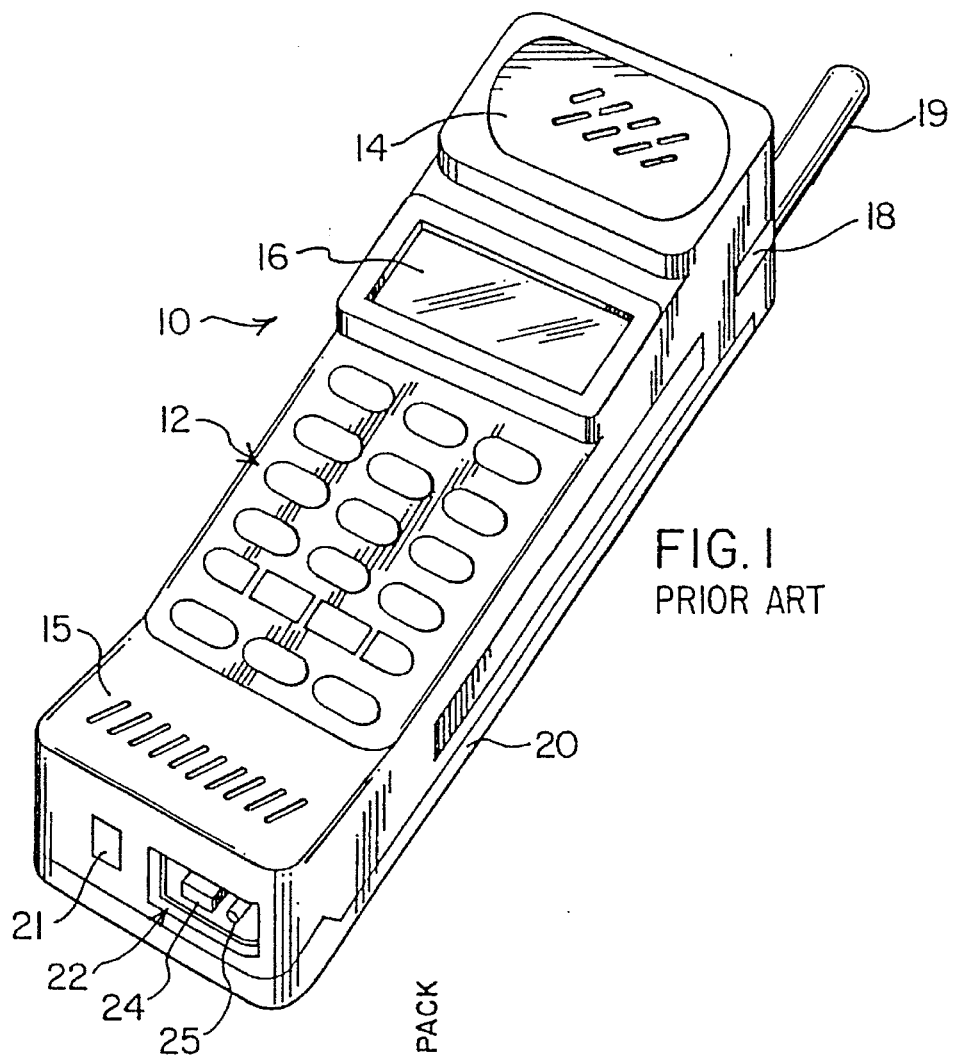
FIGS. 1 and 1A show a contemporary cellular telephone and a typical car kit, respectively.

The present invention is described below for the detailed descriptions of the embodiment with emphasis upon the automotive applications and environments. However the invention is not restricted to the automobile environment but is well suited for use in any type of environment including all types of vehicles, tractors, trucks, boats or airplanes as well as in buildings and anywhere portable units are operational.

Further, though the present invention is described below with reference to a hand-held portable cellular telephone, it is recognized that the present invention may be used with any one-way or two-way radio designed to work on any type of wireless radio network. Such networks may include analog mobile cellular telephone networks (Advanced Mobile Phone Service, or AMPS), dual-mode analog/digital mobile cellular telephone networks, purely digital mobile cellular telephone networks, or any of a range of other types of networks using cellular and other technologies. Other cellular-like services may include personal communications networks (PCNs) and satellite-based mobile radio networks such as those proposed before the FCC as low-earth-orbit (LEO) systems. Other types of radio system that these inventions pertain to include, but are not limited to, geosynchronous satellite systems such as that planned by the American Mobile Satellite Corporation and Telestat Canada, as well as conventional terrestrial mobile radio systems, Specialized Mobile Radio (SMR) systems adapted for digital data transmission, Enhanced SMR systems, and carrier-provided mobile services such as paging services, the IBM/Motorola ARDIS network, RAM Mobile Data, and any other commercial radio service.

Hand-held cellular telephones, such as unit 10 illustrated in FIG's. 1 and 1A, employ a wide variety of physical interfaces. There are a large number of models of cellular telephones in existence and each physical interconnection and electrical interface is unique to a manufacturers specific model.

Cellular phone 10 includes a typical array of features for such devices. Keypad 12 allows dialing and other data processing/generating functions. An earphone 14 is positioned at one end while a microphone/speaker 15 is located at the other end. Liquid crystal display (LCD) 16 provides a compact presentation of limited information to the user while switch 18 is for on/off control. A battery pack 20 is attached to the lower portion of phone 10 and requires periodic recharging when unit 10 is connected to the car kit 500. The phone is released for detachment from cradle 510 by manual button 21.

Interconnections with the car kit 500 are established by a plug 22 at one end of unit 10. The particular connector of FIG. 1 is a male connection with a center extension 24 having arrays of electrical contacts on the upper and lower surfaces thereof. Additionally, an RF coaxial type element 25 is included as a portion of plug 22. Note that not every cellular telephone has an RF connector even though one is included in the example shown as element 25. In conventional use, unit 10 is stored in the car kit cradle 510, and plug 22 is coupled with a complementary connector 520 car kit 500.

FIGS. 2A through 2F show a series of examples of presently used physical interconnections for cellular telephones. That is, FIG. 2A to 2F present typical examples of cylindrical, rectangular, spring contact and pad type connections used in common cellular phone units, usually in the base plate thereof. From this it is apparent the wide range of configurations and physical sizes prohibits a common interconnection to car kit 500 or the like. Such phones are expected to use even smaller connectors as the units are further miniaturized in the future.

Figure 3:
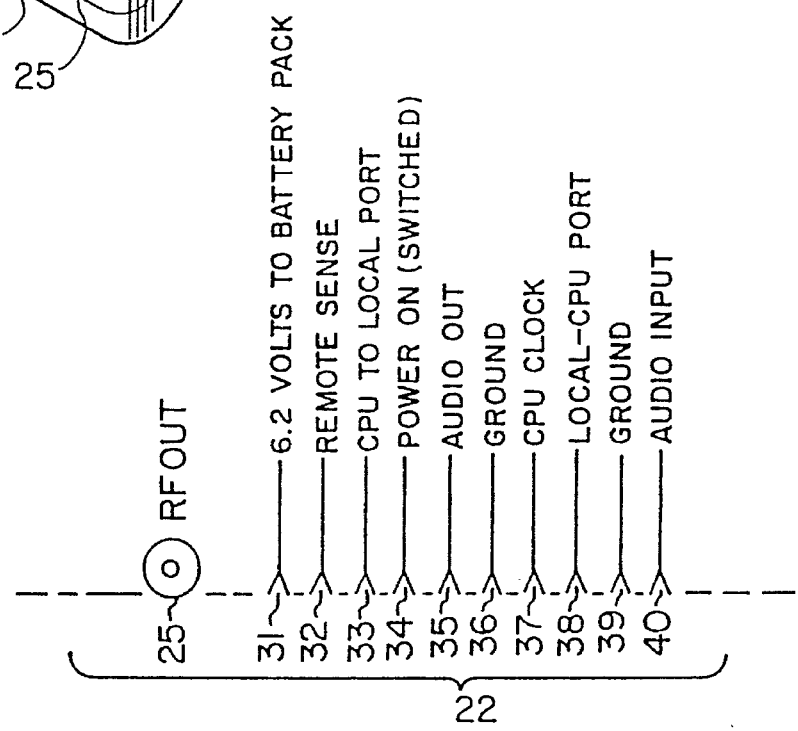
FIG. 3 is a tabulation of the electrical functions associated with a typical input/output connector for a contemporary cellular telephone.
Figure 1A:
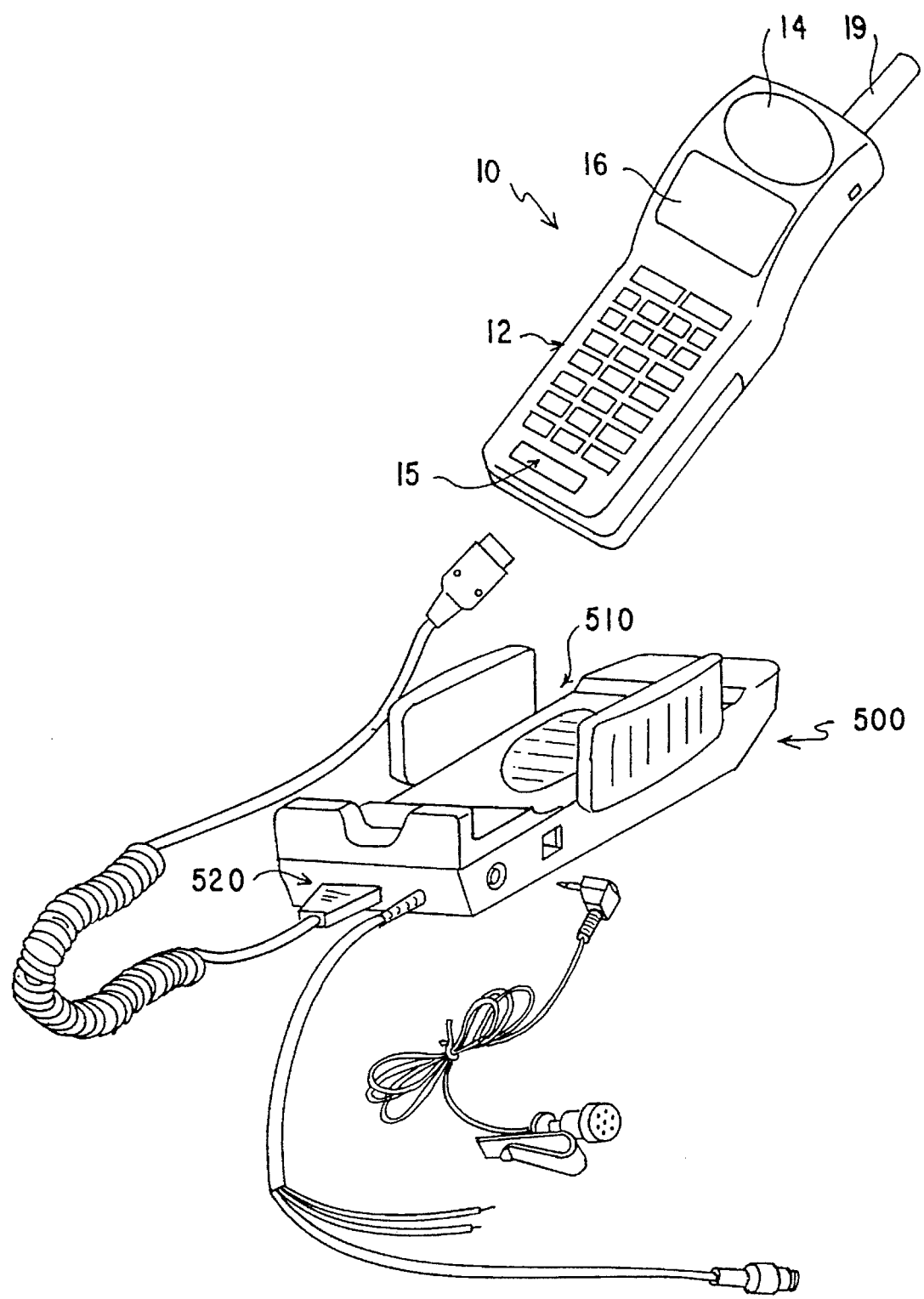
Figure 2A:
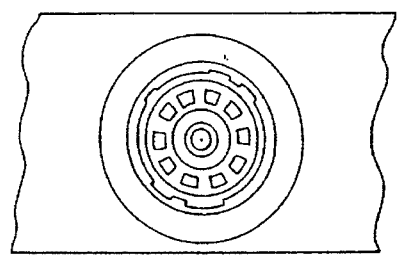
FIGS. 2A to 2F show examples of a variety of hand-held cellular telephone input/output physical interfaces.
Figure 2D:
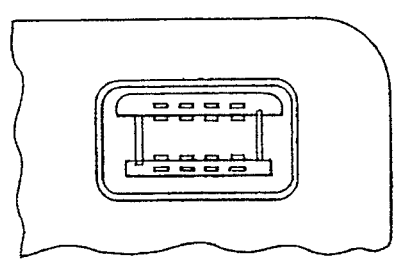
Figure 2B:
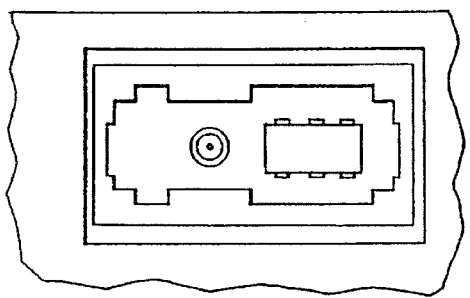
Figure 2E:
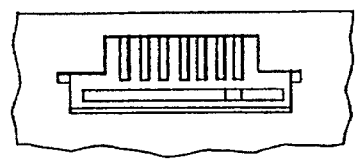
Figure 2C:
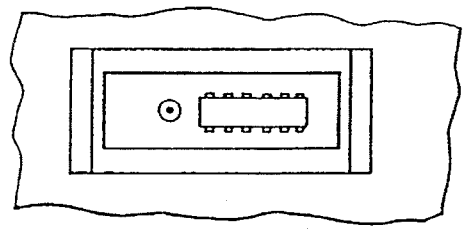
Figure 2F:
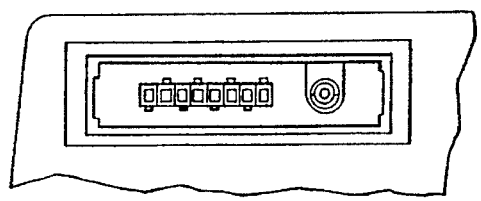

Electrical interfaces to the various phone units present still more problems. For instance, there is a wide variety of battery types and voltages used in the rechargeable battery packs incorporated into the phone units. Further, the electrical phone signals exist in a wide variety of voltage levels and signal coding schemes. A typical example of the functions assigned to the pins of a conventional phone input/output connector 22 containing connector contacts or pins 31–41 is shown in FIG. 3. Note that connector 22 of FIG. 3 might or might not represent the specific pin function assignments for connector 22 shown in FIG. 1. While there is a certain amount of commonality of functions associated with many cellular phones, the particular function assigned to a given pin often varies as does the number of functions, the number of pins and their physical configurations.

Connector 22 is shown with a coaxial connector 41 to provide for direct connection to the RF connection. Pin 31 is used for battery charging from the remote adapter, while pin 32 is used to detect the presence of the remote adapter and pin 33 is used for digital communication to the remote adapter. Pin 34 is used to signal the remote adapter that phone power is on. Pin 35 has the low level audio output signal to drive a remote speaker amplifier. Pins 36 and 39 provide internal ground connections. Pin 37 provides the CPU clock signal, pin 38 is the local to CPU communications port, and pin 39 is used to receive the signal from the remote microphone.

Figure 5:
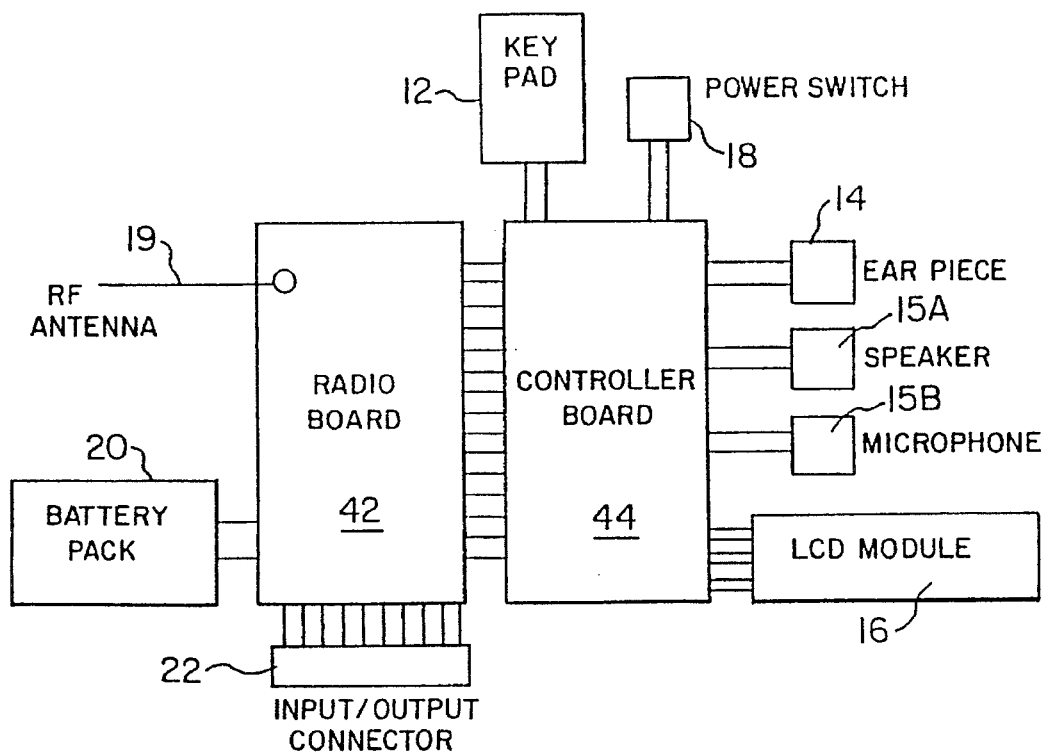
FIG. 5 is a block diagram of a typical hand-held cellular phone unit.

The internal architecture of a typical hand-held AMPS type phone unit is shown in block diagram form in FIG. 5 where further details of the interconnections with the internal block functions of the phone with the input/output connector 22 described above are presented. The peripheral elements of FIG. 5 correspond to their counterparts of FIG. 1. Note that the speaker 15A is separate from the microphone 15B but both are housed at that end of unit 10. This is to prevent production of the ringing sound directly into the ear of the user. Radio board 42 contains the radio frequency signal handling components whereas a computer including a conventional CPU with its input/output interfaces is contained in board 44. The CPU of board 44 handles all the host functions associated with the components shown.

It is possible to create a custom tailored adapter cable configured internally to transpose connections between the various interconnection disciplines along the lines of those shogun in FIG. 2. The present invention in part contemplates creation of an adapter cable with a universal interface as a common connector at one end but with that cable provided with a suitable connector at the other end to attach to a particular connector configured to another contact assignment discipline. To accomplish this goal, two problems are solved. First, a suitable connector is designed so that any phone unit is accommodated regardless of electrical interface. Second, means are provided to determine exactly what phone unit is connected to the adapter cable so that the electronic interface can properly adapt to that phone.

A suitable connector must meet several conflicting requirements. An acceptable connector system must be low cost, allow a variety of mounting arrangements and have characteristics suitable for its intended operating environment such as for use not only in automobiles but also in vehicles, boats, trucks, airplanes, trains, tractors, residences, and so forth. Often the operating environment demands shielding of the cable and connector as protection against interference with other equipment that is interference signal sensitive as well as to protect the phone system from interference signals. Such a connector and adapter cable system is shown in FIG. 4 and described below.

A universal connector 45 is arranged in accordance with a predetermined assignment of pin functions. On the opposite end of cable 46 is a connector 48 configured to attach to a particular cellular phone such as one of those illustrated in FIGS. 2A–2F. The conductors within cable 46 are connected within plugs 46 and 48 so that the pin functions are matched. As is likewise described in greater detail below, connector 45 can include an arrangement for providing a signal to the using device attached to plug 45 wherein the signal is encoded to identify the kind of cellular phone plugged into connector 48 at the other end of cable 46.

Figure 9:
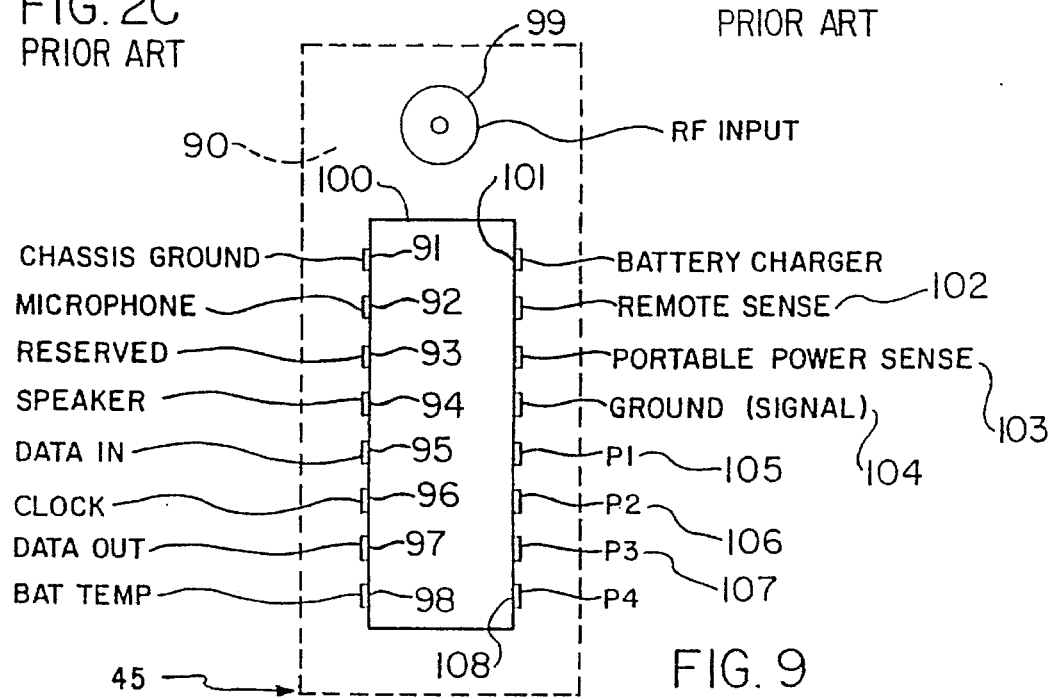
FIG. 9 is a tabulation of an exemplary connection assignment discipline for use in conjunction with the present invention.

One example of a suitable connector for providing a standard interface connection as for the FIG. 4 cable is illustrated in FIG. 9. This connector is preferably panel mounted and consists of a protective hood 90 protecting a rectangular center block 100 of insulating material with parallel rows of contacts. Each row preferably has eight gold plated, substantially flat contacts 91–98 and 101–108. These contacts are formed slightly convex in order to create miniature leaf springs which provide pressure with the contacts of the mating connector. Thus the interface to the mating connectors is such that they are self-cleaning by means of the self wiping action during insertion. This is an especially important consideration in automobile applications.

Note that, if desired, hood 90 could provide a shield against outside signals interfering with the cable signals or, conversely, against signals in cable 46 from interfering with other equipments. This is possible by electrically connecting hood 90 to a sleeve type RF shield encasing the main body of cable 46 and a similar shielding hood at the opposite end connector 48.

The contact pins 91–98 and 101–108 are arrayed along each side of block 100 with the tubular, coaxial radio frequency (RF) connector 99 located in spaced relation towards one end. A typical such connector 99 is 0.10 inches in diameter with acceptable radio frequency characteristics such as a low standing wave ratio at frequencies of 800 to 900 Mhz suitable for attachment to a coaxial cable. Connections to the contacts are conventional as by soldering, crimping or the like. The center block 100 and RF connector 99 are recessed in a rectangular shell 90 to provide protection from physical damage. The mating connector has the same characteristics with the housing designed to provide protection cable strain relief and a locking mechanism to provide secure engagement but allow easy removal.

Assuming connector 45 of FIG. 4 is arranged in accordance with FIGS. 9 whereas connector 48 on the opposite end of cable 46 is configured pursuant to the FIG. 3 discipline, the conductors through cable 46 would interconnect the pins at each plug which have comparable functions. A coaxial cable would thus couple RF plug 25 with RF plug 99. Conductors would also interconnect battery pin 31 with charger pin 101, both pins 36 and 39 with ground pin 91, clock pin 37 with pin 96, pin 35 with pin 92, and pin 40 with pin 94. Further, pin 34 is connected with pin 103 while pin 32 is interconnected with pin 102. Finally pin 33 is coupled to pin 97 while pin 38 goes to pin 95 as does pin 35.

If one of the grounds at pins 36 and 39 of FIG. 3 are signal grounds rather than chassis grounds, that particular pin might connect with pin 104. In the standard established by FIG. 9, pins 105–108 identified as P1–P4 are employed for device identification purposes as is described in detail in FIGS. 6, 7 and 8. Note that the FIG. 9 connector has a battery temperature sensor input terminal 98. This is to accommodate cellular phones that include such a sensor output even though the FIG. 3 connector does not include this function. When the control device attached to plug 90 senses the model type identification from terminals 105–108, it would realize that the phone model involved here does not have a battery temperature sensing signal and would ignore pin 98. Otherwise the controller adjusts its interconnections and support functioning for terminals 91–98 and 101–104 to fully cooperate with the phone connected via appropriate conductors to the other end of the cable from connector 90.

FIG. 10 shows connector 120, a snap-in bulkhead mounting version, that mates with the adapter cable. Installed from the front of the panel in a rectangular cut out, a trim bezel 121 forms a front panel mounting surface. As is common practice, molded clips such as 122 allow easy insertion but expand and lock against the rear surface of the panel retaining the connector body while accommodating a range of panel thickness. This and the following version are useful for original equipment automobile installation.

Assembly 125 of FIG. 11 is somewhat similar to FIG. 10 but is designed for either front or rear insertion of connector 126. For example, a bezel assembly 128 includes snap-mount retaining clips such as 129 to hold assembly 128 in a panel opening similar to the FIG. 10 clips as described above. Assembly 128 acts as a receiver for connector body 126 which in this example has snap tongues such as 130 on the upper and lower surfaces which engage respective slots such as slots 131 and 132 in the bezel assembly 128. Rear mounting is desirable in some cases where the cable is permanently affixed to an electronics module for example. Many variations of this and the previous mounting method are possible to provide easier installation and lower product cost. For instance, it is possible to integrate the bezel with the dashboard fascia molding eliminating or modifying elements of the mounting method.

FIG. 12 illustrates a connector 110 that mates with the adapter cable. This version resides in a housing 112 designed in a manner identical to the common automotive cigarette lighter assembly which is approximately ⅞ inches in diameter. It can include means to secure it to the panel such as retaining tabs 115 and a locating groove 116 especially if it is removable. Installation is by replacing the existing lighter assembly without requiring permanent modification to the vehicle. If necessary the original lighter assembly can be re-installed at some future time to restore the vehicles to its original condition. This version is useful in an aftermarket installation kit.

FIG. 13 is a mating cable end to the adapter cable used when it is desired to provide an extension cable or to allow a variety of mounting methods which may attach directly to the connector or cable body. That is, connector 75 is attached to cable 76 which corresponds to cable 46 of FIG. 4. The connector on the other end of cable 76, although not shown in FIG. 13, is the same as connector 45 of FIG. 4. Receiving female connector elements 77 and 78 are thus compatible with attachment to a male connector constructed the same as plug 45.

One embodiment for determining the make and model of the phone employs a cable adapter to identify itself to the electronics module. This is accomplished in the FIG. 6A–6D configuration by a lumber of pins reserved at the processor or common end of the cable connector for use as a programming device. An electrically conductive structure 50 containing a plurality of physically and electrically interconnected pins 51–55 is inserted into and retained by connector body 58 as seen in FIG. 6B. A short connecting link 56 extends above ridge or shoulder 57 above the connector body 58 when connector 50 is inserted therein. These links are preferably clipped in a binary pattern to produce the identification data for the processor so that it can determine the type of cellular phone attached to the other end of the cable.

Figure 6A:
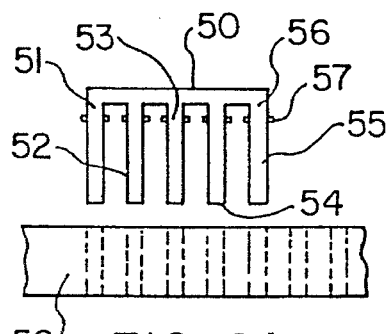
FIGS. 6A to 6D illustrate one method of embodying a coded adapter cable connector in accordance with this invention.
Figure 6C:
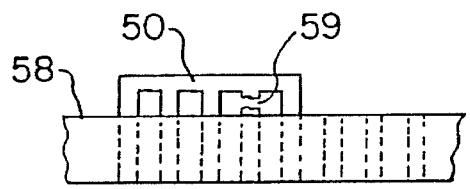
Figure 6B:
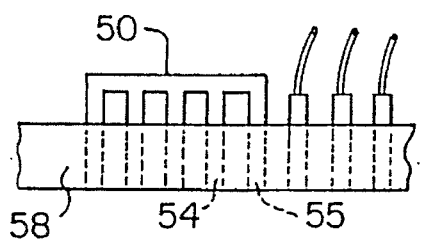
Figure 6D:
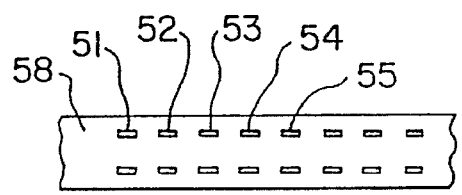

For example, if link 54 is clipped as shown as gap 59 in FIG. 6C, the resulting circuit to pin 54 is opened. Thus electrical current sensing of the pins 51–55 in FIG. 6D will reflect the open circuit status of pin 54. The connector body 58 includes conventional, well-known means (not shown) for retaining the end of the clipped contact in place so as to prevent it from falling out or sliding back into the connector body when the connectors are coupled.

If pin 55 is considered a common bus and is connected to circuit common receiver 60 as shown in FIG. 7, then decode logic circuitry 66 can establish a voltage at the mating connector 60 by means of a resistor network 70 connected to the digital logic supply voltage 72. For this example, assume pin. 51 represents the most significant bit and in sequence pin 54 represents the least significant bit. Thus the digital pattern 0001 is detectable at the mating connector 60 by the decode logic 66. The connector 50 configuration thereby allows detection of a total of 16 different identification codes or 32 if system ground (91 or 104) is used. The use of additional connector pins can substantially increase the number of available unique codes. If desired, it is possible to generate the digital or analog identification codes at the cellular phone or its connector. However, this requires circuit complexity and additional conductors through the cable which is avoided by incorporation of the code generation in the universal connector as described herein.

In a typical system configuration, a computer is part of the host assembly although hard wired control units or other combinations of electronic elements are acceptable. The control unit or computer stores a series of blocks of data in a memory or other data storage device with each block containing the instructions necessary for controlling the universal connector interfacing circuits to operate through the universal connector into a particular type of cellular telephone. The blocks of data are each retrievable from the data storage device in accordance with the identification code presented to the computer on the universal connector. The controlling device uses the retrieved data to set up a compatible set of switches, voltage levels, signal paths, etc., at the host system universal connector interface to work with the kind of cellular telephone specified by the identification data. The system likewise is controlled to establish normal operations with the attached cellular telephone thereafter. The system is ready to function whenever a cellular telephone is connected to one end of a cable with the other end attached to the host system universal connector input port.

In a typical operation, the decoding device in the host assembly samples the universal connector 50 pin connections which are specified as the source of code signals for identification of the type of connector and/or telephone present on the other end of the cable. The processor does this by decoding the binary identification number from those pins. The processor actually identifies the type of phone via a table look-up operation. Once having determined the cellular phone type, the processor next establishes the necessary interfacing voltages, signal protocols and interconnections to allow the base unit to communicate with the phone in an appropriate manner compatible with the type of phone attached.

Yet another embodiment for providing coding is shown in FIG. 8. In this embodiment, analog to digital (A/D) converter 80 provides a reference voltage (Vref) to line 81 which is presented to the mating connector pins 82 and 83. The voltage produces a current through the circuit consisting of resistor 84 (Rprog) and resistor 85 (RFixed) in a half-bridge configuration providing a voltage at pin 87 which is connected to the signal input of A/D converter 80. A 6 bit A/D converter can provide 64 possible binary codes to logic 86. The value for each Rprog resistor 84 is calculated from the equation: Vout*RFixed/(Vref-Vout). An example of this calculation is shown in appended Table I wherein Rprog is a list of programming resistor values which uniquely determine one of the 64 possible input voltages to the D/A converter 80 which result in distinct binary output codes. RFixed is the half-bridge calibrating resistor 85 and Vref is present on line 81. In Table I, Vref is 5.0 volts, RFix is 100 k ohms, "Hex" is a hexadecimal address and the Rprog terms such as "1.43E+03" means a resistive value computed as 1430 ohms.

Yet another version of the previously discussed apparatus and methods is to use a plurality of programming resistors with one end connected in common to Vref and a like number of A/D converters. This can provide a large expansion in the number of identification bits or allow the use of less expensive A/D converters having fewer conversion bits.

The foregoing description of a universal connector for a cellular phone interface is found in copending and commonly assigned U.S. patent application No. 07/773,840 now U.S. Pat. No. 5,333,177.

As described above, the universal connector cable can be used to connect any cellular phone to a properly formatted car kit. Importantly, the car kit to which the phone is connected must be operable to adapt its operations depending on the model of cellular phone used. For example, a typical car kit includes means for providing power to a cellular phone through the car battery. However, different types of cellular phones require different levels of DC voltage to operate. Therefore, in order to effectively power the cellular phone with the car battery, the car kit must be able to adjust the amount of voltage supplied according to the particular needs of the cellular phone to which it is connected. Providing too little or too much voltage to a particular cellular phone could cause the phone to malfunction or be permanently damaged. Similarly other variations in the specifications of different cellular phones must be accounted for in order to create a universally adaptable car kit.

Figure 14:
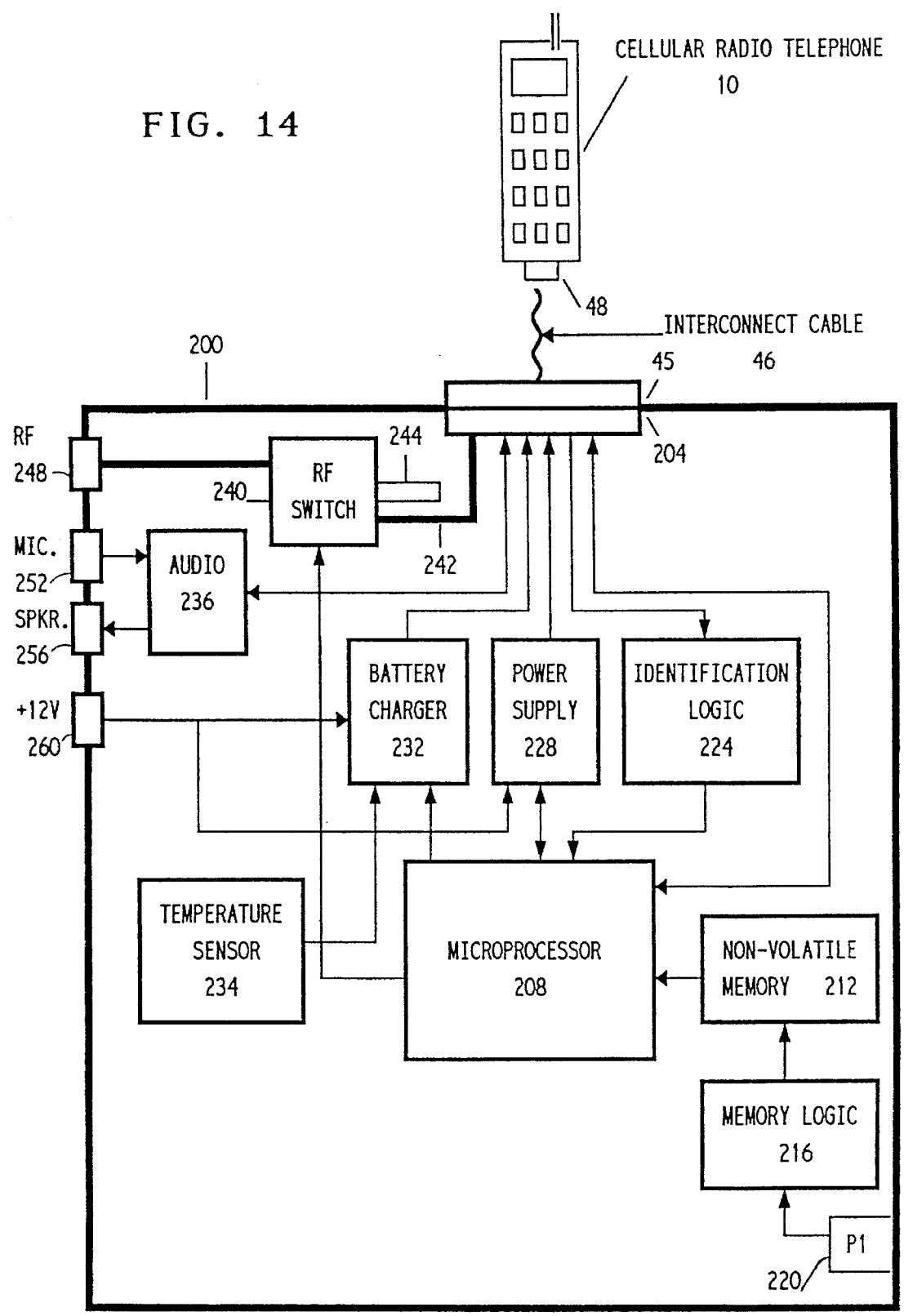
FIG. 14 is an illustration of a universal car kit controller in accordance with one embodiment of the present invention.

Accordingly, FIG. 14 illustrates a universal car kit in accordance with one embodiment of the present invention. Cellular radio telephone 10 is interconnected with car kit controller 200 through interconnect cable 46 as previously described. Cellular phone 10 may be any model of cellular phone, analog or digital. Car kit connector 204 is provided to matingly connect to a universal connector 45 such as the ones illustrated in FIGS. 7–9.

When cellular phone 10 is initially connected to car kit controller 200, identification logic 224 samples the pins of universal connector 45 through car kit connector 204 in order to determine the model of cellular phone 10. Two processes for determining the model of cellular phone 10 through sampling of universal connector 45 are detailed above with respect to FIGS. 7 and 8. Upon sampling of the pins of universal connector 45, identification logic 224 receives coded information, regarding the model of cellular phone 10, which it provides to microprocessor 208. Microprocessor 208 then performs a table look-up of data stored in non-volatile memory 212.

Non-volatile memory 212 preferably comprises a flash RAM and contains data linking the coded information received from identification logic 224 with data regarding the specifications of the particular model of cellular phone 10. Specifically, different models of cellular phones have different requirements as to the amount of DC voltage required to operate, current requirements for battery charging, audio levels for sending and receiving, etc. Microprocessor 208 must be able to accommodate these varying phone specifications if car kit controller 200 is to be operable with any model cellular phone 10. Thus, non-volatile memory 212 is provided with all of the necessary specifications for every model of cellular phone currently available. In addition, port 220 and memory logic 216 are provided for programming of non-volatile memory 212 when new models of cellular phones become available. Port 220 is preferably an RJ-11 connector, and memory logic 216 preferably comprises memory support circuitry for providing programming voltages and clock signals. A summary of some of the specifications to which the car kit controller 200 is able to adjust is given below.

One of the main functions of a car kit is to provide a means for powering a hand-held cellular phone through the car's battery, thereby maintaining the charge of the phone's internal battery. However, as discussed above, the level of DC voltage required is dependent on the model of cellular phone 10. Thus, car kit controller 200 is provided with power supply regulator 228. Power supply regulator 228 comprises an electronic voltage regulator interconnected between the car battery and cellular phone 10. Most cars are provided with a nominally 12 volt battery. This voltage is too high for a typical cellular phone. Thus, power supply regulator 228 reduces the amount of voltage applied to cellular telephone 10. The specific level of voltage applied to cellular phone 10 by power supply regulator 228 is dependent on the model of cellular phone 10 and is stored in non-volatile memory 212.

Similarly, car kit controller 200 may be used to charge the internal battery of cellular phone 10 while cellular phone 10 is attached to the car kit. Battery charge regulator 232 also .draws power from the car battery through connector 260. Battery charge regulator 232 preferably provides a constant current to the internal battery pack 20 of cellular phone 10 through interconnect cable 46. In order to ensure that battery pack 20 is not overcharged, current to battery pack 20 is cut off when battery charger 232 determines that a voltage threshold has been reached. Both the level of the constant current and the level of the voltage threshold are variable and dependent on the stored specifications for the particular model of cellular phone 10. In addition, temperature sensor 234 may be provided to measure the ambient temperature near the phone (the sensor may be placed in the cradle of the car kit where cellular phone 10 sits). If the ambient temperature exceeds a predetermined threshold, battery charge regulator 232 ceases to provide a current to internal battery pack 20, thereby avoiding possible damage to the battery pack 20 or the cellular telephone 10.

As previously noted, not all cellular phones include an RF connection 25 as shown in FIG. 3. The present invention provides an RF switch 240 which allows all cellular phones, including those which do not include an RF connection 25, to transceive information using an external antenna. Microprocessor 208 receives data from nonvolatile memory 212 indicating whether or not the specific model of cellular phone 10 (identified by identification logic 234) includes an RF connector 25. If so, microprocessor 208 sets RF switch 240 to directly connect RF connector 25 through coaxial cable 242 to external antenna connection 248. If cellular phone 10 does not include RF connector 25, then microprocessor 208 sets RF switch 240 to passively couple cellular phone antenna 19 to antenna loop 244 which is directly connected to external antenna connection 248.

Car kit controller 200 also includes circuitry to adjust a car kit speakerphone application to the needs of any cellular phone 10. Audio interface 236 includes an adjustable amplifier for varying the audio levels of voice signals sent to and received from microphone and speaker connections 252 and 248, respectively. Again, microprocessor 208 receives specifications from non-volatile memory 212 regarding the appropriate send and receive audio levels for the identified cellular phone 10. Microprocessor 208 then adjusts the amplification of signals passing through audio interface 236 in either direction as appropriate.

Non-volatile memory 212 also provides microprocessor 208 with information on how to interpret signals from and format signals to the identified cellular phone 10. For example, when cellular phone 10 is first connected to car kit controller 200, microprocessor 208 sends a signal to cellular phone 10 acknowledging that cellular phone 10 is now connected to a car kit. This causes cellular phone 10 to blank its own microphone and speaker so that the car kit can perform its hands-free operation.

Figure 15:
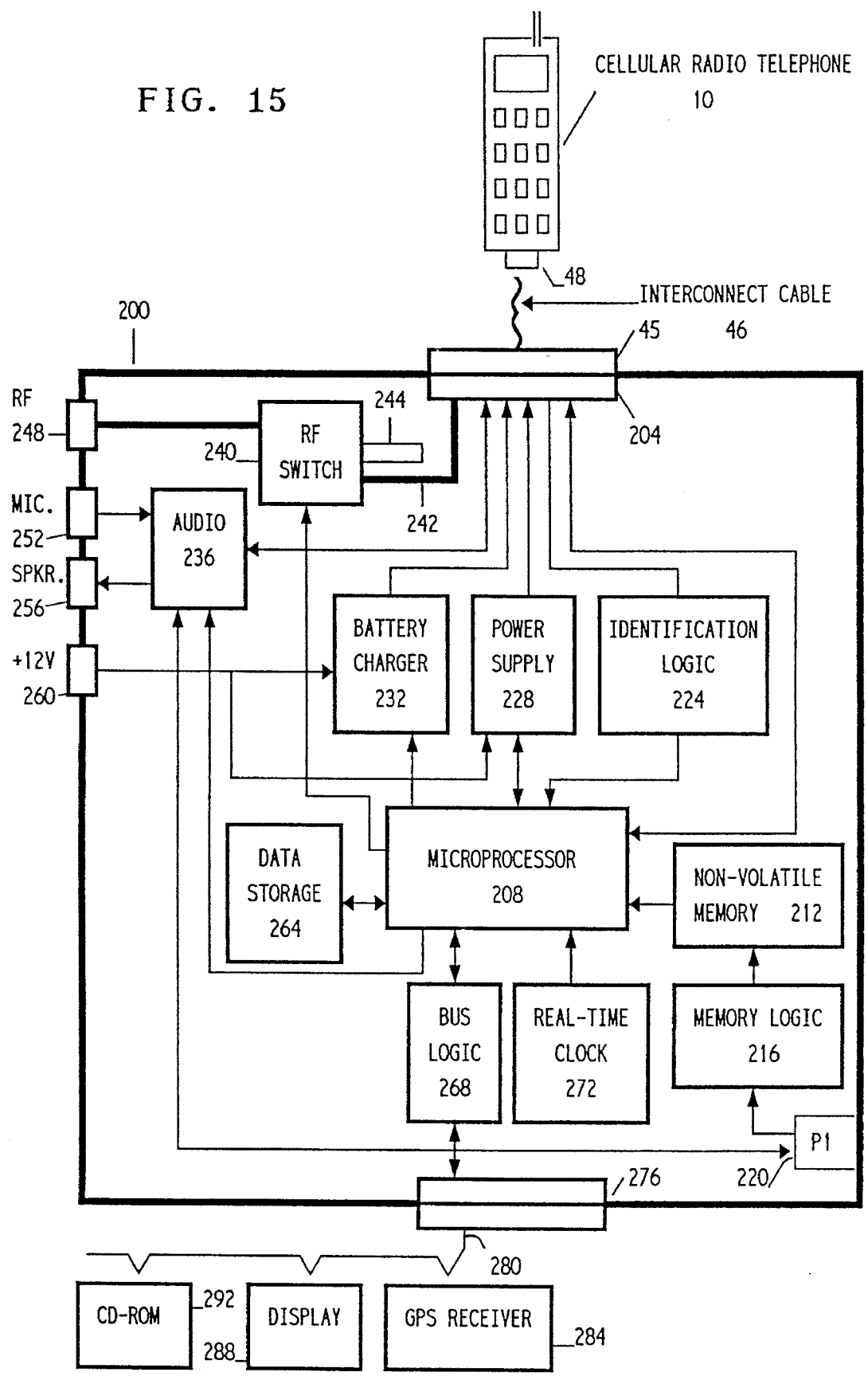
FIG. 15 is an illustration of a universal car kit controller including peripheral devices in accordance with one embodiment of the present invention.

In another embodiment, car kit controller 200 may also be used to control the transmission of data to and from a number of peripheral devices via an airlink provided by cellular phone 10. As illustrated in FIG. 15, car kit controller 200 is provided with bus logic 268 to control bus 280 to which a plurality of peripheral devices are connected. Bus connector 276 interconnects bus 280 to bus logic 268. A data storage device 264, which may comprise a disk drive or semiconductor memory device, is provided to buffer information passing between the peripheral devices and cellular phone 10. Data storage device 264 may be especially useful in matching the speeds of bus 280 and the RF airlink provided by cellular phone 10. Typically, bus 280 operates at a much higher baud rate than the RF airlink. It is therefore advantageous, when data is being received via the RF air-link, to store all of the data in storage device 264 until the entire transmission is received. The data may then be sent to the appropriate peripheral device over bus 280 in a continuous stream and at the operating speed of bus 280. In this way, bus 280 is not hindered by the slower baud rate of the RF air-link, and peripheral devices may communicate over bus 280 while data is being received over the RF air-link and buffered in storage device 264.

Bus 280 may be a parallel type (standard IEEE-488 or SCSI, for example) or a suitable serial type (such as one complying with EIA RS-425 standards). It is also recognized that a serial fiber optic structure could be used. Bus 280 preferably permits any of the peripheral devices attached to it to communicate with any other of the peripheral devices. Bus 280 also provides a means for any peripheral device to send data through car kit controller 200 to cellular phone 10 so as to allow the peripheral devices to communicate via RF signals with remote devices.

The operation of this embodiment of the invention is not dependent on whether cellular phone 10 comprises a conventional AMPS type phone or a newer architecture phone such as TDMA or CDMA. Thus, the following operational descriptions of this embodiment of the present invention will be discussed without reference to a particular model of cellular phone 10. It is recognized that whatever model of cellular phone 10 used must be modified to provide a data path for digital data through connector 48. In addition, for the purposes of the following discussion it will be assumed that cellular phone 10 contains circuitry to packetize and depacketize digital data transmitted and received by the cellular phone 10. It is preferable that the digital channel in whatever cellular phone is employed be provided with connections to assigned pins on connector 48 so that digital data may be transmitted over interconnect cable 46.

In operation, cellular telephone 10 may receive RF signals containing data addressed to one of the peripheral devices. The data is passed via interconnect cable 46 to microprocessor 208. Microprocessor 208 formats the data according to the needs of the peripheral device to which the data is addressed. The data is then either buffered or passed directly through bus connector 276 to the appropriate peripheral device one bus 280.

Car kit controller 200 further comprises circuitry to allow this process to be reversed to allow any of the peripheral devices to send data through car kit controller 200 and cellular phone 10 and out of the car using RF signals. Accordingly, a duplex digital path is provided between bus 280 and cellular phone 10, for allowing digital information to be transmitted through car kit controller 200 in either direction.

Figure 16:
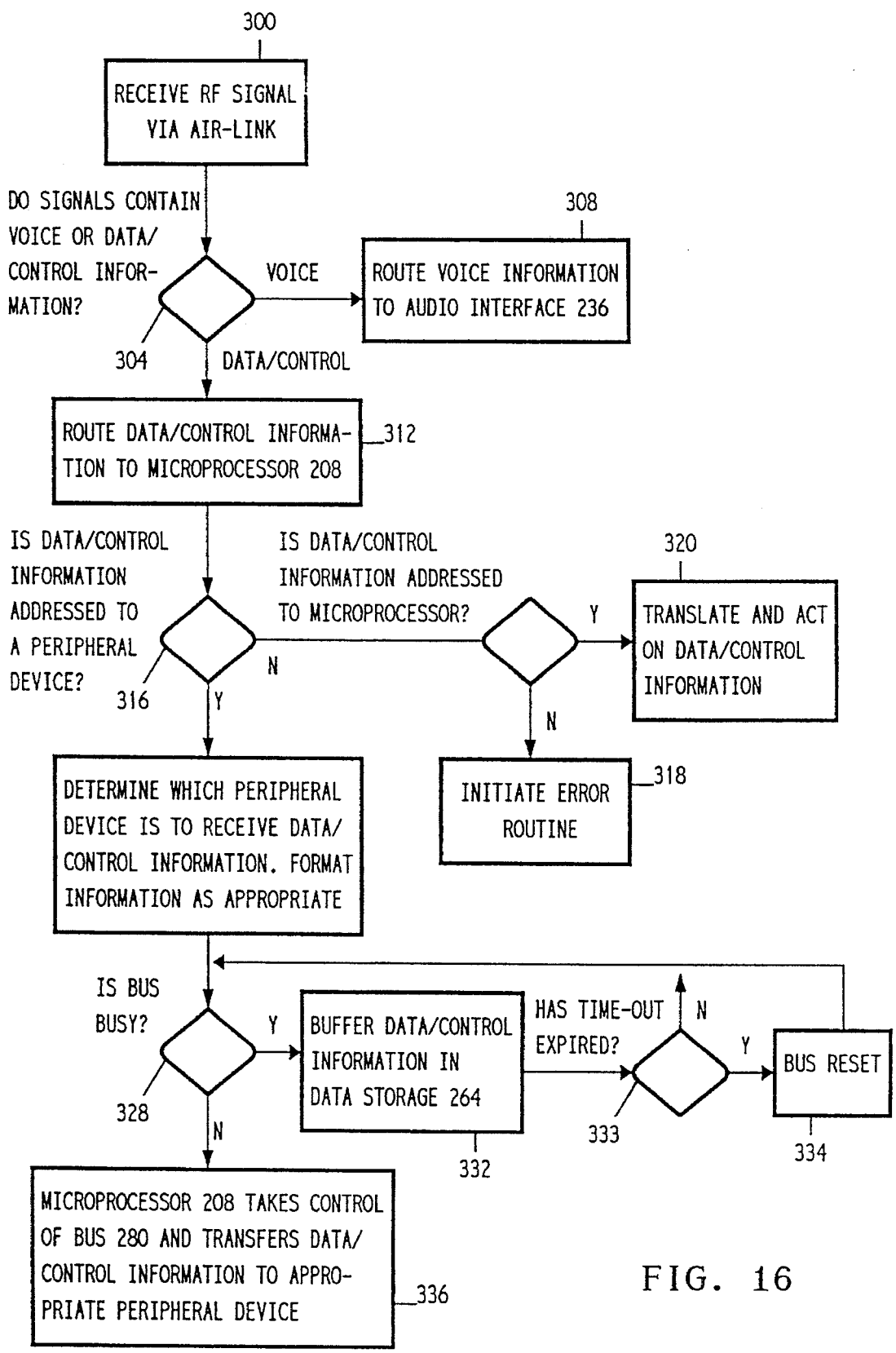
FIG. 16 is a flow chart illustrating the operation of one embodiment of the present invention shown in FIG. 15.
Figure 17:
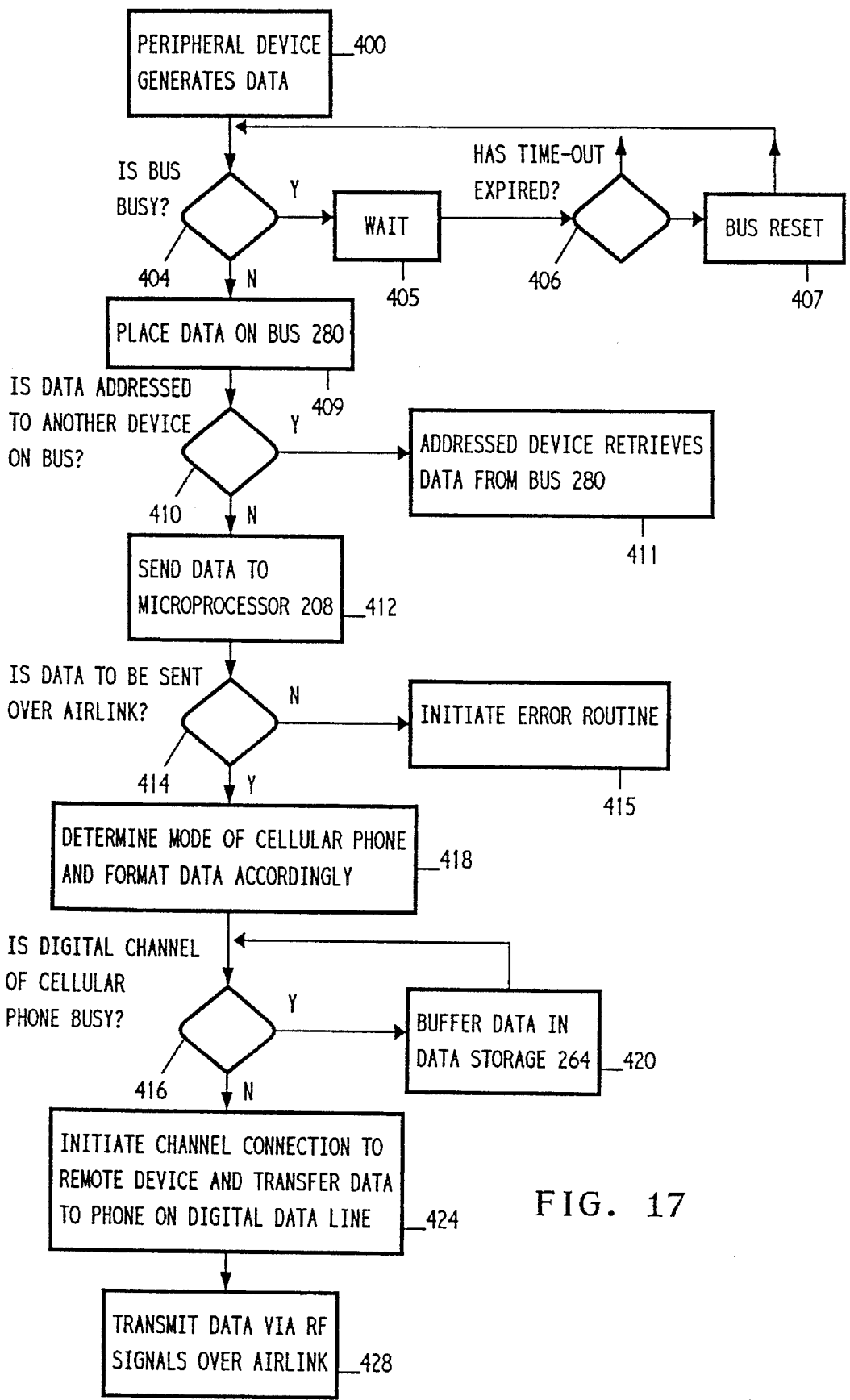
FIG. 17 is a flow chart illustrating the operation of another embodiment of the present invention shown in FIG. 15.

A summary of the operation of this embodiment of the present invention is illustrated in FIGS. 16 and 17. Note that the flow-chart of FIG. 16 begins after the phone has been attached to and identified by car kit controller 200. Cellular telephone 10 receives RF signals via an RF air-link at block 300, and decides internally whether the RF signals contain voiceband or data/control information (block 304). If voiceband information is detected, it is routed by the phone to its audio output line 35 and subsequently through interconnect cable 46 to audio interface 236. Audio interface 236 then transfers the voiceband information to its speaker connection or to output port 220. A facsimile machine or modem may be attached to port 220. Since conventional facsimile machines include internal modems to convert digital signals to analog, a facsimile machine connected to port 220 may send analog data through audio interface 236 and through cellular phone 10 using the voice channel.

If the information contained in the RF signals is digital data, the data is routed through interconnect cable 46 to microprocessor 208. In block 316 microprocessor 208 determines if the data is addressed to one of the peripheral devices attached to bus 280. If the data is not addressed to one of the peripheral devices, microprocessor 208 determines (block 317) if the data is addressed to itself. If so, microprocessor 208 translates and acts on the data (320). Data and control information addressed to microprocessor 208 via RF signals may contain information to reprogram the microprocessor remotely or demand and initiate all or part of desired routine. If the data is not addressed to microprocessor 208 or one of the peripheral devices, a predetermined error routine is initiated (block 318).

If the data is addressed to a peripheral device on bus 280, microprocessor 208 determines which device is to receive the data and checks to ensure that the data is formatted correctly for the particular peripheral device (block 324). If not, microprocessor 208 may format the data appropriately before transferring it. In block 328, microprocessor 208 checks bus logic 268 to determine if bus 280 is busy (bus logic 268 preferably determines which device controls bus 280 according to a predetermined priority hierarchy). If so, the data is buffered in data storage device 264 at block 332. Bus logic 268 may contain circuitry to reset bus 280 if bus 280 has been monopolized by a single device for longer than a preset amount of time. In block 333, bus logic 268 determines if bus 280 has been monopolized for longer that the preset "time-out" period. If not, it checks again to see if the bus is busy. This process continues until either bus 280 becomes free or is reset (block 334) by bus logic 268 after the time-out has expired. Once the bus is free, microprocessor 208 transfers the data to the appropriate peripheral device (336).

The predetermined priority hierarchy used by bus logic 268 to decide which competing device should gain control of bus 280 is variable dependent on the peripheral devices present and the applications for which they are used. For example, assume a printer and an accident and emergency notification alarm (AENA) are connected to bus 280. If the AENA attempts to send a notification of an accident via the RF air-link to emergency crews at the same time a message is to be forwarded to the printer, bus logic 268 may be programmed to give priority to the AENA. In less extreme situations, priority may be determined by a rotating hierarchy or other means.

FIG. 17 illustrates the operation of the present invention when the data to be transmitted by RF signals originates at one of the peripheral devices on bus 280. One of the peripheral devices generates data (400) which it addresses to another device. The peripheral device to send data checks to see if bus 280 is free (404), and if not, the device must wait to place its data on the bus (405). Again, bus logic 268 determines if the preset time-out has expired (406) and resets the bus (407) if the time-out has expired. Once bus 280 is free, either naturally or by bus reset, the data to be sent is placed on bus 280. Once the data is present on the bus, each of the devices attached to bus 280 (including microprocessor 208) determines if the data is addressed to it (410). If so, the addressed device retrieves that data from bus 280. If the data is not addressed to one of the peripheral devices on bus 280, it is forwarded to microprocessor 208 (412). Microprocessor 208 determines (414) if the data is to be sent via an RF air-link to a remote device. If not, microprocessor 208 initiates a predetermined error routine (415). If microprocessor 208 determines from the address that the data is to be sent to a remote device via RF signals, it checks to see if the digital channel of cellular phone 10 is being used (416). If the channel is busy, the data is buffered in data storage device 264 until the digital channel is free (420). Microprocessor 208 then initiates a connection to the remote device via the digital channel of cellular phone 10 (424). The data is transmitted via RF signals by the phone to the appropriate remote device (428).

Note that, with the exception of when a facsimile machine or modem connected to port 220 is being used to transmit or receive data on the voice channel, while data is being received or transmitted by cellular phone 10, the phone may be simultaneously used for voice communications when supported by the RF air-link protocol. Also note that in order to accomplish all of asynchronous tasks outlined above, microprocessor 208 should have multi-tasking capabilities.

As shown in FIG. 15, some of the peripheral devices which may be connected to bus 280 are a Global Positioning System (GPS) receiver 284, a display unit 288, and a Compact Disc Read Only Memory (CD-ROM) 292. In one application of the present invention, car kit controller 200 may use cellular phone 10 to provide data communications between the peripheral devices on bus 280 with a dispatcher at a delivery service company. For example, if the dispatcher desires to know the location of one of its vehicles which is equipped with car kit controller 200, cellular phone 10, and all of the peripheral devices shown, he sends a digital request via RF signals to cellular telephone 10 asking for the vehicle's location. The request is transferred through interconnect cable 46 to microprocessor 208. Microprocessor 208 interprets the request and sends a command to GPS receiver 284 via bus 280 asking for the position of the vehicle. GPS receiver 284 responds by placing the position data on bus 280 where it is transferred to microprocessor 208, through interconnect cable 46 to cellular phone 10 and back to the dispatcher via RF signals. In an alternate embodiment, real time clock 272 is used to initiate a command by microprocessor 208 to GPS receiver 284 requesting at regular intervals that position information be sent to the dispatcher via RF signals. In this way, the dispatcher can receive information on the position of each of his vehicles without having to initiate the contact.

After receipt of the position data, the dispatcher may determine that the vehicle is in close proximity to another pick-up location. The dispatcher sends another message with information regarding the new pick-up location through the means described to display unit 288. Display unit 288 responds by sending a separate message to CD-ROM 292 over bus 280 requesting map information. CD-ROM 292 responds by sending map data for the desired new pick-up location to the display unit 288. Display unit 288 then displays the map information and textual information contained in the message from the dispatcher regarding the exact location of the package to be picked up.

In other applications of the present invention, peripheral devices attached to bus 280 can include a vehicle monitoring system (VMS), a security system, a printer, an accident and emergency notification alarm (AENA), a synthesized speech system (SSS), a speech recognition system, a computer, and a personal digital assistant (PDA). All of the peripheral devices attached to bus 280 are able to send and/or receive information both to/from other peripheral devices on bus 280 and to/from remote devices using RF signals.

For example, in the present invention a navigational positioning device such as a GPS receiver 284 may be used in combination with each of the following.

1. A VMS to alert a car dealership when the vehicle breaks down. The VMS provides diagnostic information as to the condition of the vehicle's engine, and the GPS receiver provides information as to the position of the vehicle. The car dealership could then dispatch a roadside service vehicle to the exact location of the broken-down vehicle with the proper parts for repair.

2. A security system to initiate a call to a security monitoring service if the car is broken into. The GPS receiver then provides the security service with the exact location of the vehicle.

3. An AENA to initiate a call to emergency squads via the cellular phone upon detonation of an airbag or other health emergency device. The GPS receiver then allows emergency crews to determine the location of the accident.

In addition, display terminal 288 may be used in the present invention to display electronic mail messages received by cellular phone 10. Also, display terminal 288 could be used in combination with a VMS to display a status report on the condition of the vehicle either graphically or with text. Display terminal 288 may additionally be employed to extend the screen of a PDA or portable computer which may also be attached to bus 280 as a peripheral device.

A VMS connected to bus 280 in the present invention may be used to report diagnostic information to a computer which is also attached to bus 280 for display or analysis, A VMS may also allow a service center to download and run diagnostic tests to the vehicle's computer remotely. Additionally, a VMS may be interfaced with an SSS on bus 280 to report warnings or failures in the car's operations to the driver.

APDA attached to bus 280 may be used as an dialer to dial cellular phone 10 or receive and send electronic mail.

A digital facsimile machine may also be employed on bus 280 (as opposed to conventional analog fax machines which would be connected to port 220 as described above).

A synthesized speech system (and/or a speech recognition system) may be used to control any or all of the peripheral devices on bus 280, and may also be used to transmit data to the driver from one of the peripheral devices.

In addition, an AENA may be used in combination witch a VMS on bus 280 to report the make, model, color, and license plate number along with the emergency signal to 911 for more accurate identification.

A printer may also be connected to bus 280 and receive information from any of the peripheral devices attached to bus 280 or directly from RF signals received by cellular phone 10.

While the majority of examples cited above are directed to an embodiment where car kit controller is located in a car, it is recognized that this technology may be expanded beyond the vehicle embodiment. Specifically, it is anticipated that a similar unit to car kit controller 200 could be placed in an office or home. In this manner, a user could simply take this phone from his car and plug it into the unit in the office or home which would control peripheral devices there. Thus, a user could conceivably have only one telephone number for his office, home, and car. In addition, it is recognized that the present invention is operable with any wireless radio device and not only a cellular telephone as described above.

While the exemplary preferred embodiments of the present invention are described herein with particularity, those having normal skill in the art will recognize various changes, modifications, additions and applications other than those specifically mentioned herein without departing from the spirit of this invention.

TABLE I

APPENDIX
For Vref = 5 and RFix = 100000

| Step | Hex | Rprog | Vout |
|---|---|---|---|
| 1 | 0 | 1.43E+03 | 0.070 |
| 2 | 1 | 2.89E+03 | 0.141 |
| 3 | 2 | 4.40E+03 | 0.211 |
| 4 | 3 | 5.96E+03 | 0.281 |
| 5 | 4 | 7.56E+03 | 0.352 |
| 6 | 5 | 9.22E+03 | 0.422 |
| 7 | 6 | 1.09E+04 | 0.492 |
| 8 | 7 | 1.27E+04 | 0.563 |
| 9 | 8 | 1.45E+04 | 0.633 |
| 10 | 9 | 1.64E+04 | 0.703 |
| 11 | A | 1.83E+04 | 0.773 |
| 12 | B | 2.03E+04 | 0.844 |
| 13 | C | 2.24E+04 | 0.914 |
| 14 | D | 2.45E+04 | 0.984 |
| 15 | E | 2.67E+04 | 1.055 |
| 16 | F | 2.90E+04 | 1.125 |
| 17 | 10 | 3.14E+04 | 1.195 |
| 18 | 11 | 3.39E+04 | 1.266 |
| 19 | 12 | 3.65E+04 | 1.336 |
| 20 | 13 | 3.91E+04 | 1.406 |
| 21 | 14 | 4.19E+04 | 1.477 |
| 22 | 15 | 4.48E+04 | 1.547 |
| 23 | 16 | 4.78E+04 | 1.617 |
| 24 | 17 | 5.09E+04 | 1.688 |
| 25 | 18 | 5.42E+04 | 1.758 |
| 26 | 19 | 5.76E+04 | 1.828 |
| 27 | 1A | 6.12E+04 | 1.898 |
| 28 | 1B | 6.49E+04 | 1.969 |
| 29 | 1C | 6.89E+04 | 2.039 |
| 30 | 1D | 7.30E+04 | 2.109 |
| 31 | 1E | 7.73E+04 | 2.180 |
| 32 | 1F | 8.18E+04 | 2.250 |
| 33 | 20 | 8.66E+04 | 2.320 |
| 34 | 21 | 9.16E+04 | 2.391 |
| 35 | 22 | 9.69E+04 | 2.461 |
| 36 | 23 | 1.03E+05 | 2.531 |
| 37 | 24 | 1.08E+05 | 2.602 |
| 38 | 25 | 1.15E+05 | 2.672 |
| 39 | 26 | 1.21E+05 | 2.742 |
| 40 | 27 | 1.29E+05 | 2.813 |
| 41 | 28 | 1.36E+05 | 2.883 |
| 42 | 29 | 1.44E+05 | 2.953 |
| 43 | 2A | 1.53E+05 | 3.023 |
| 44 | 2B | 1.62E+05 | 3.094 |
| 45 | 2C | 1.72E+05 | 3.164 |
| 46 | 2D | 1.83E+05 | 3.234 |
| 47 | 2E | 1.95E+05 | 3.305 |
| 48 | 2F | 2.08E+05 | 3.375 |
| 49 | 30 | 2.22E+05 | 3.445 |
| 50 | 31 | 2.37E+05 | 3.516 |
| 51 | 32 | 2.54E+05 | 3.586 |
| 52 | 33 | 2.72E+05 | 3.656 |
| 53 | 34 | 2.93E+05 | 3.727 |
| 54 | 35 | 3.16E+05 | 3.797 |
| 55 | 36 | 3.41E+05 | 3.867 |
| 56 | 37 | 3.71E+05 | 3.938 |
| 57 | 38 | 4.04E+05 | 4.008 |
| 58 | 39 | 4.42E+05 | 4.078 |
| 59 | 3A | 4.87E+05 | 4.148 |
| 60 | 3B | 5.40E+05 | 4.219 |
| 61 | 3C | 6.03E+05 | 4.289 |
| 62 | 3D | 6.80E+05 | 4.359 |
| 63 | 3E | 7.77E+05 | 4.430 |
| 64 | 3F | 9.00E+05 | 4.500 |

What is claimed is:

1. A method for transferring digital information over an air link relative to a plurality of peripheral devices communicating with a common bus, comprising:

receiving signals having digital information from an air link using circuitry contained in a housing;

obtaining said digital information from said signals, said signals also including control information related to identifying at least a first of a plurality of peripheral devices, said digital information to be received by said first of said plurality of peripheral devices, with said digital information to be received by said first peripheral device first being received by and outputted from a peripheral device controller having a processor, each of said plurality of peripheral devices having an address and each of said peripheral devices being communicable with each of all of the other of said plurality of peripheral devices and said peripheral device controller being addressable by each of said plurality of peripheral devices;

determining an identification of said first peripheral device that is to receive said digital information;

sending said digital information to said first peripheral device using a signal conducting common bus that each of said plurality of peripheral devices communicates with, said common bus being located externally of said circuitry housing;

making a determination automatically including without operator intervention that second digital information associated with a second peripheral device is to be transmitted using said circuitry;

transferring said second digital information from said second peripheral device to said peripheral device controller; and transmitting said second digital information from said circuitry through the air link to a remote device after receiving said second digital information by said peripheral device controller.

2. A method, as claimed in claim 1, wherein:

said receiving step includes receiving said RF signals using a cellular telephone.

3. A method, as claimed in claim 2, wherein:

said receiving step includes outputting voiceband information while simultaneously receiving said digital information.

4. A method as claimed in claim 2, further comprising the step of:

providing a means for outputting digital information from said cellular telephone.

5. A method, as claimed in claim 1, wherein:

said obtaining step includes obtaining analog information from said signals.

6. A method, as claimed in claim 1, wherein:

said determining step includes controlling transfer of said digital information based on a priority determination relative to said first peripheral device and said second peripheral device.

7. A methyl, as claimed in claim 1, wherein:

said making step includes sensing a first event using said second peripheral device.

8. A method, as claimed in claim 7, wherein:

said sensing step includes alerting a predetermined remote source that said first event was sensed.

9. A method, as claimed in claim 1, wherein:

said sending step includes monitoring said second peripheral device and, when a first condition is detected, generating said second digital information using said second peripheral device.

10. A method, as claimed in claim 1, wherein:

said inputting step includes prioritizing a transfer between said first and second digital information.

11. A method, as claimed in claim 1, wherein:

said plurality of peripheral devices include at least a plurality of the following: a Compact Disc ROM, a navigational positioning device, a keypad, a personal digital assistant, a facsimile machine, a video display unit and a sensor for indicating that a predetermined event was detected.

12. A method, as claimed in claim 1, further comprising:

locating said circuitry and said peripheral device controller in a vehicle.

13. A method, as claimed in claim 12, further including:

disconnecting said circuitry from said peripheral device controller and removing said circuitry from the vehicle.

14. A method, as claimed in claim 13, further including:

electrically connecting said circuitry to another peripheral device controller located remote from the vehicle.

15. A method, as claimed in claim 1, wherein said sending step includes a plurality of the following steps:

performing a diagnostic check of a vehicle using a vehicle monitoring system;

requesting positioning information from a navigational positioning device;

communicating with a computer terminal;

obtaining data from a CD Read Only Memory;

sending said digital information to a facsimile machine;

outputting said digital information using a synthesized speech system;

printing said digital information received on said RF transceiver;

displaying said digital information on a display terminal.

16. A method, as claimed in claim 1, wherein said transferring step includes a plurality of the following steps:

sending positioning data from a navigational positioning device;

sending data from a computer terminal;

sending data stored in a CD ROM;

sending diagnostic data from a vehicle monitoring system;

sending data from a digital facsimile machine;

sending data translated by a speech recognition system;

sending data from a security system;

sending data from an accident and emergency notification alarm;

sending data from a personal digital assistant.

17. An apparatus for controlling the transfer of digital information carried through an air link, comprising:

circuitry contained in a housing for receiving and transmitting signals carried through an air link;

a plurality of peripheral devices, each of said peripheral devices for receiving and/or outputting information and at least some of said plurality of peripheral devices, including a first peripheral device, for inputting and/or outputting digital information;

a peripheral device controller communicating with each of said plurality of peripheral devices, said peripheral device controller receiving digital information from said circuitry and determining an identity of said first peripheral device for receiving said digital information, said peripheral device controller including processing means and in which said digital information to be received by said first peripheral device is first received by and outputted from said peripheral device controller;

first means for interconnecting said circuitry with said peripheral device controller; and second means for interconnecting said peripheral device controller and each of said plurality of peripheral devices, said second means including a signal conducting common bus that each of said peripheral devices communicates with, said common bus being located externally of said circuitry housing, each of said plurality of peripheral devices having an address and each of said peripheral devices communicable with each of all of the other of said plurality of peripheral devices and said peripheral device controller being addressable by each of said plurality of peripheral devices, wherein digital information is able to be transferred, free of control by said peripheral device controller processor, between each of said plurality of peripheral devices including between said first peripheral device and a second peripheral device and is also able to be transferred from said peripheral device controller to each of said plurality of peripheral devices.

18. An apparatus, as claimed in claim 17, wherein:

said peripheral device controller is operable to transfer information from said plurality of peripheral devices to said circuitry.

19. An apparatus, as claimed in claim 18, wherein:

said peripheral device controller includes means for formatting information transferred from said circuitry to said peripheral devices and information transferred from said peripheral devices to said circuitry.

20. An apparatus, as claimed in claim 19, wherein:

said formatting means includes means for packetizing digital information according to the type of circuitry used and the baud rates of said peripheral devices.

21. An apparatus, as claimed in claim 17, wherein: said circuitry includes a cellular telephone removably connectable to said peripheral device controller.

22. An apparatus, as claimed in claim 17, wherein:

said first means for interconnecting includes a coupler that allows communication between said peripheral device controller and a selected one of a plurality of RF transceivers, with each of said plurality of RF transceivers having an output connector different from all others of said plurality of RF transceivers.

23. An apparatus, as claimed in claim 17, wherein:

said peripheral device controller further includes battery power regulating means for regulating battery power to components of said peripheral device controller.

24. An apparatus, as claimed in claim 17, wherein:

said plurality of devices includes at least some of the following: a digital information storage device, a CD Read Only Memory, a video display unit, a facsimile machine, a detecting device, a synthesized speech system, an accident and emergency notification alarm, and a printer.

25. An apparatus, as claimed in claim 17, wherein:

said second means includes bus logic means separable from but communicating with said peripheral device controller and said common bus for controlling transfers of digital information relative to said peripheral devices.

26. An apparatus, as claimed in claim 25, wherein:

said bus logic means discontinues communication between said first peripheral device and said common bus when said common bus has been used by said first peripheral device for longer than a predetermined time interval.

27. An apparatus, as claimed in claim 17, wherein:

each of said peripheral devices is able to initiate communication with said peripheral device controller, but subject to a predetermined peripheral device priority.

28. An apparatus, as claimed in claim 17, further comprising:

peripheral devices in addition to said plurality of peripheral devices and wherein all of said peripheral devices including said plurality of peripheral devices communicate with said common bus and communicate with each other when communication is requested but depending upon common bus priority and availability.

29. An apparatus, as claimed in claim 17, wherein:

all of said digital information to be sent to one or more of said peripheral devices is received by said peripheral device controller.

\* \* \* \* \*